P. MEDVED.
DEVICE FOR UTILIZING WIND POWER.
APPLICATION FILED OCT. 19, 1914.
1,132,956.
Patented Mar. 23, 1915.
2 SHEETS—SHEET 1.
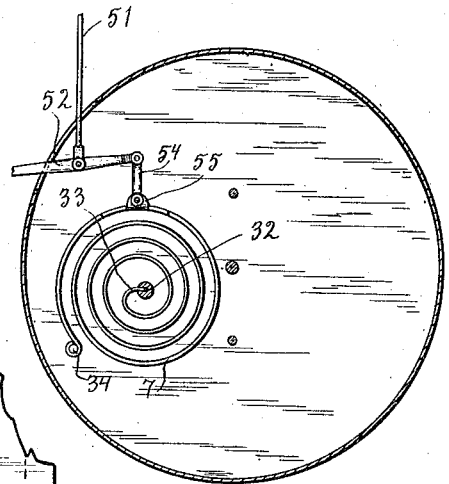
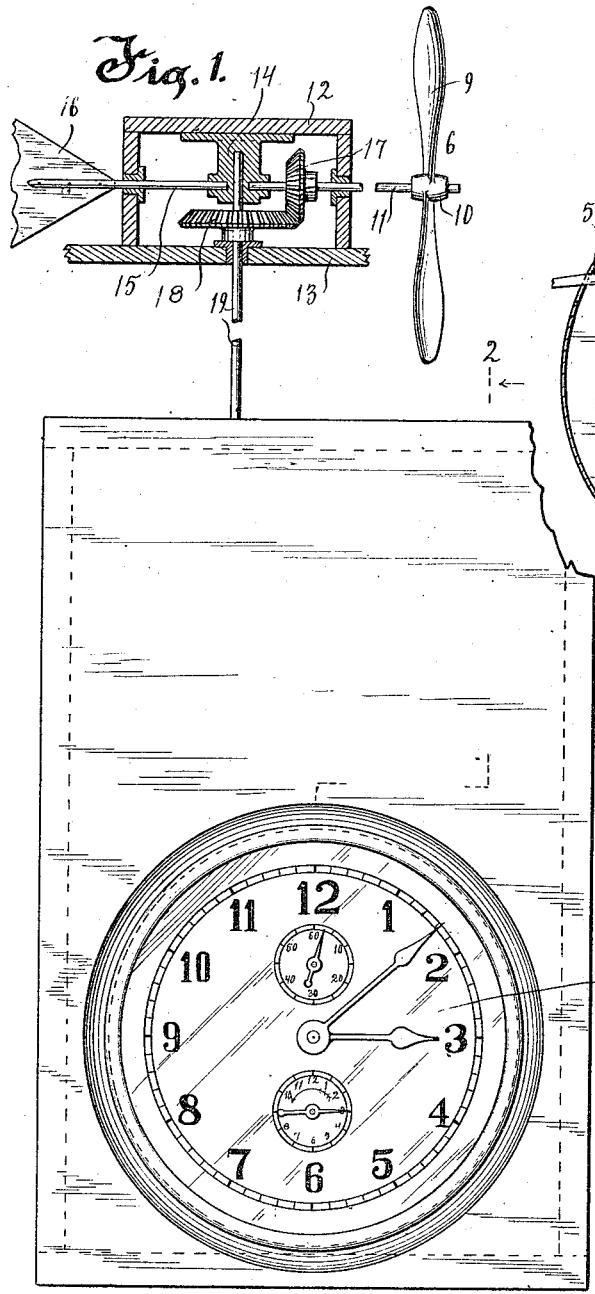
WITNESSES.
R. F. Miller.
Emily Schowalter.
INVENTOR
Paul Medved
By Morsell, Keeney & French.
ATTORNEYS.

P. MEDVED.
DEVICE FOR UTILIZING WIND POWER.
APPLICATION FILED OCT. 19, 1914.

1,132,956.

Patented Mar. 23, 1915.

2 SHEETS—SHEET 2.

WITNESSES
R. F. Miller
Emily Schowalter

INVENTOR
Paul Medved

Morsell, Keeney & French
ATTORNEYS

UNITED STATES PATENT OFFICE.

PAUL MEDVED, OF MILWAUKEE, WISCONSIN.

DEVICE FOR UTILIZING WIND-POWER.

1,132,956.  Specification of Letters Patent.  Patented Mar. 23, 1915.

Application filed October 19, 1914. Serial No. 867,289.

*To all whom it may concern:*

Be it known that I, PAUL MEDVED, a citizen of the United States, and resident of Milwaukee, in the county of Milwaukee and State of Wisconsin, have invented new and useful Improvements in Devices for Utilizing Wind-Power, of which the following is a description, reference being had to the accompanying drawings, which are a part of this specification.

The invention relates to power transmission mechanism.

The invention designs more particularly to provide power transmission mechanism whereby wind power may be utilized to wind up a spring motor such as a clock.

The invention further designs to provide a power transmission mechanism for utilizing wind power to wind up a spring motor and to provide means for throwing the transmission mechanism into gear with the spring motor when it starts to run down and for throwing said mechanism out of gear with said motor when it is wound up.

The invention further designs to provide a new and improved form of power transmission mechanism for transforming wind power into mechanical power.

The invention consists in the several features hereinafter set forth and more particularly defined by claim at the conclusion hereof.

Figure 3:
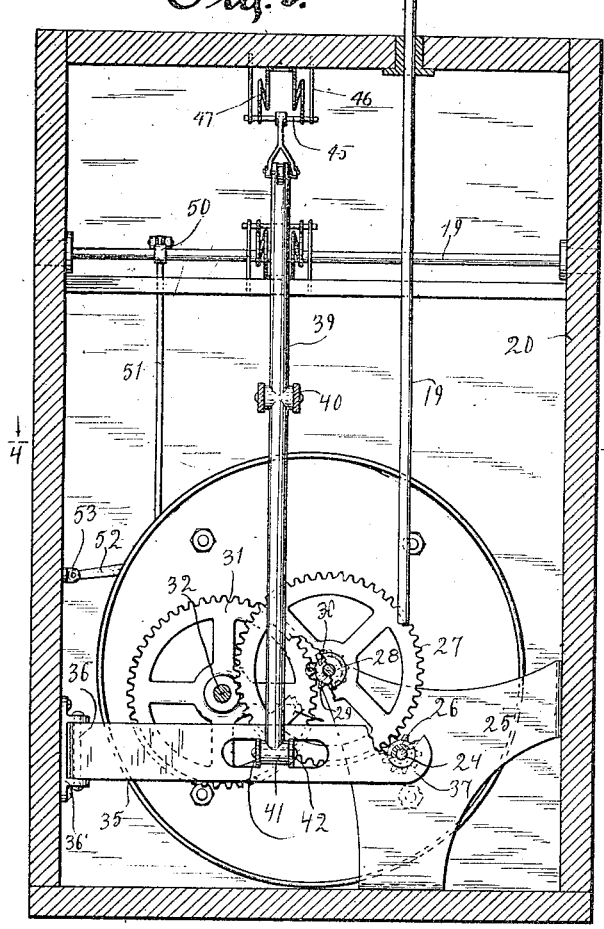
Figure 2:
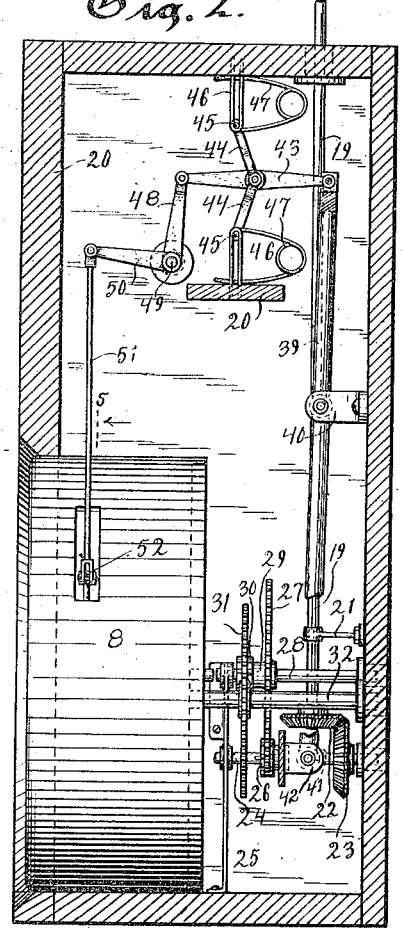
Figure 4:
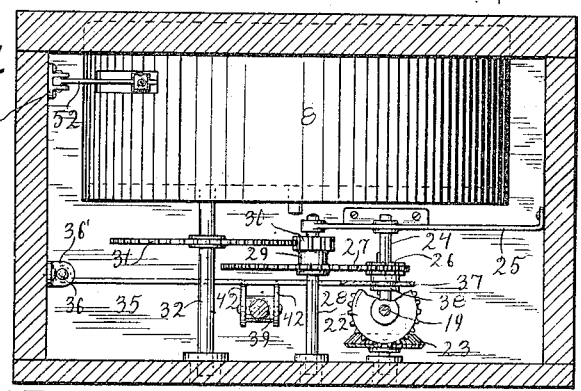

In the drawings Figure 1 is an elevation of the device embodying the invention (parts being shown in section); Fig. 2 is a section taken on line 2—2 of Fig. 1; Fig. 3 is a section taken on line 3—3 of Fig. 2; Fig. 4 is a section taken on line 4—4 of Fig. 3; Fig. 5 is a section taken on line 5—5 of Fig. 2.

The invention consists of a wind wheel 6, mechanism for transmitting power from said wind wheel 6 to a spring motor which may be used to drive a clock 8 and means for throwing the power transmitting means into or out of driving relation with said spring motor.

The wind wheel 6 comprising wind blades 9 and hub 10 is mounted upon a shaft 11 journaled in a revoluble frame 12 mounted upon a support 13 and a bracket 14 secured to said frame. A shaft 15 secured to the frame 12 and bracket 14 carries a wind vane 16 for moving the frame 12 and consequently the wheel 6 into position to be acted upon by the wind.

The power transmission mechanism comprises a bevel gear 17 mounted upon the shaft 11 and in mesh with a bevel gear 18 mounted upon a shaft 19 which is journaled in the bracket 14, the support 13, a casing 20 for the motor and a bracket 21. The shaft 19 carries a bevel gear 22 mounted upon the shaft within the casing 20 and in mesh with a bevel gear 23 mounted upon a shaft 24 journaled in the casing 20 and in a bracket 25, which shaft also carries a gear 26 keyed to the shaft and slidably mounted thereon. This gear 26 may be thrown into or out of mesh, by means hereinafter described, with a gear 27 mounted upon a shaft 28 journaled in the casing and in the bracket 25. The gear 27 has a hub 29 which is provided with a gear 30. The gear 30 meshes with a gear 31 mounted upon a motor shaft 32 journaled in the casing and carrying one end 33 of the spring 7 which is secured at its other end to a fixed pin 34. Resultantly the turning of the shaft 11 by the windwheel 6 will drive the shaft 19 through the gears 17 and 18 which in turn will drive the shafts 24, 28 and 32 through the gearing previously described and consequently turn said shaft 32 to wind up the spring motor 7.

After the spring motor 7 is wound up it is necessary to throw the power transmission mechanism out of driving relation therewith or when the spring starts to run down it is likewise necessary to throw said transmission mechanism into driving relation with the motor shaft 33 and this is accomplished by means automatically operated by the winding and unwinding of the spring. This means comprises a lever 35 pivotally secured at one end 36 to a bracket 36' on the casing and at its other end 37 in a groove 38 in the hub of the gear 26 forming a clutch so that the swinging of the lever 35 will move the gear 26 keyed to the shaft 24 upon said shaft into or out of engagement with the gear 27 to wind up or stop the winding of the spring 7. Means are connected to the lever 35 for operating the same which are automatically operated by the winding and unwinding of the springs. This means comprises a lever 39 pivoted intermediate its ends in a bracket 40 secured to the casing and pivotally secured at one end 41 to lugs 42 in the lever 35. The other end of the lever 39 is pivotally secured to one end of a link 43 which is pivotally connected to one of the ends of a pair of oppositely disposed links 44 which are pivotally secured to pins 45 at their other ends, which pins are slidably mounted in guides 46 and are resiliently supported therein by means of springs 47 secured to them and the casing. The springs 47, guides 46, pins 45 and links 44 serve to accelerate the movement of the links 43 to quickly move the gear 26 into or out of engagement with the gear 27. The other end of the link 43 is pivotally secured to a crank 48 mounted on a shaft 49 journaled in the casing. This shaft 49 carries a crank 50 to the free end of which one end of link 51 is pivotally secured, the other end of said link being pivotally secured intermediate the ends of a lever 52. This lever 52 is pivoted at one end to a bracket 53 secured to the casing and at its other end to one end of link 54 which is pivotally secured at its other end to a lug 55 on the spring 7.

The operation of the means for automatically throwing the transmission mechanism into or out of gear with the spring motor is as follows: The winding up of the spring 7 by the turning of the shaft 32 by the power transmission mechanism causes said spring to wind around the shaft and its outer convolution to move inwardly moving the link 54 with it and the lever 52 downwardly which causes the links 51 and crank 50 to move downwardly to turn the shaft 49 and causes the crank 48 thereon to move the link 43 toward the left and the movement of the crank over the dead center between the points of pivotal connection of the links 44 is facilitated by the springs 47, as the link 43 moving downwardly and toward the left causes the pin 45 in the lower link 44 to move downwardly in the guide 46 against the action of the lower spring 47 and the pin 45 in the upper link to move upwardly in the upper guide 46 against the action of the upper spring 47 so that when the link 43 has moved past dead center the springs 47 will accelerate the movement of the link 43 and cause it to quickly move the upper end of the lever 39 toward the left, which results in moving the lower end of the lever 39 to the right and consequently the movement of the free end of the lever 35 toward the right to quickly throw the gear 26 out of mesh with the gear 27 to prevent further rotation of the motor shaft 32. Conversely when the spring 7 becomes unwound, the outer convolution of said spring will move the link 54 and lever 52 upwardly which causes the link 51 and crank 50 to move upwardly to rotate the shaft 49 and cause the crank 48 thereon to move the link 43 toward the right which by the action of the link 44 and springs 47 causes the quick movement of the upper end of the lever 39 toward the right and lower end of said lever toward the left to move the lever 35 toward the left and quickly throw the gear 26 into mesh with the gear 27, after which the wind wheel 6 through the power transmission mechanism will again turn the shaft 32 to wind up the motor.

The invention thus exemplifies a device for utilizing wind power to wind up a spring motor by providing power transmission mechanism between the wind wheel and said motor and means for automatically throwing said power transmission mechanism into driving relation with the motor when the spring becomes unwound and for throwing it out of driving relation with the motor when the spring is wound up.

The invention is not to be restricted to the details of construction herein set forth but may be varied so as to be within the scope of appended claims.

What I claim as my invention is:—

1. A device for utilizing wind power comprising a wind-wheel, a spring motor, power transmission mechanism between said wheel and motor, a clutch for throwing said power transmission mechanism into or out of driving relation with said motor, and means operatively connected to the spring of the motor and operated by the lateral movement of said spring for operating said clutch.

2. A device for utilizing wind power comprising a wind wheel, a spring motor, power transmission mechanism between said wheel and motor, a clutch for throwing said power transmission mechanism into or out of driving relation with said motor, and means comprising linkage operatively connected to said clutch and to the spring of the motor whereby the lateral movement of said motor-spring will operate said clutch.

3. A device for utilizing wind power comprising a wind wheel, a spring motor, power transmission mechanism between said wheel and motor, a clutch for throwing said power transmission mechanism into or out of driving relation with said motor, means operatively connected to the spring of the motor and operated by the lateral movement of said spring for operating said clutch, and means for accelerating the movement of said clutch operating means.

4. A device for utilizing wind power comprising a wind wheel, a spring motor, power transmission mechanism between said wheel and motor, a clutch for throwing said power transmission mechanism into or out of driving relation with said motor, means comprising linkage operatively connected to said clutch and to the spring of the motor and movable laterally with the spring for operating said clutch, and means for accelerating the movement of said clutch-operating means.

5. A device for utilizing wind power comprising a casing, a shaft, a wind wheel mounted thereon, a spring motor, power transmission mechanism comprising gearing and connection between said shaft and motor, a clutch comprising a shiftable gear for throwing said power transmission mechanism into or out of driving relation, and linkage for operating said shiftable gear comprising a lever pivotally secured to the casing and means connected to the spring of the motor and operated by the lateral movement of said spring for operating said lever.

6. In combination, a spring motor, comprising an arbor and a spring, a clutch having a driving and a driven member, the former slidably engaging with the latter, means for driving the driving member of the clutch, and means for throwing said driving member into or out of driving relation comprising linkage connected to said spring and operated thereby.

7. In combination, with a driving means, of a spring motor, power transmission mechanism between said driving means and said spring motor, a clutch for throwing said power transmission mechanism into or out of driving relation with said motor, means for operating said clutch comprising linkage operatively connected to said spring and means for accelerating the movement of said linkage comprising a plurality of spring pressed links.

In testimony whereof, I affix my signature, in presence of two witnesses.

PAUL MEDVED.

Witnesses:
THOMAS MEDVED,
LOUIS O. FRENCH.

Copies of this patent may be obtained for five cents each, by addressing the "Commissioner of Patents, Washington, D. C."